(12) United States Patent
Boyer et al.

(10) Patent No.: US 6,361,591 B1
(45) Date of Patent: Mar. 26, 2002

(54) SEALER FROM ASPHALT AND PITCH

(75) Inventors: D. Chris Boyer, Huntington, WV (US); Patricia K. Doolin, Ashland, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 09/467,865

(22) Filed: Dec. 20, 1999

Related U.S. Application Data

(60) Provisional application No. 60/114,522, filed on Dec. 31, 1998.

(51) Int. Cl.⁷ .............................................. C09D 195/00
(52) U.S. Cl. ........................ 106/277; 106/278; 106/279; 106/280; 208/23
(58) Field of Search ............................. 208/23; 106/277, 106/278, 279, 280

(56) References Cited

U.S. PATENT DOCUMENTS

| | | | | |
|---|---|---|---|---|
| 4,139,397 A | * | 2/1979 | Yan | 106/278 |
| 4,188,235 A | * | 2/1980 | Espenscheid et al. | 106/278 |
| 4,304,606 A | * | 12/1981 | Louis et al. | 106/278 |
| 4,437,896 A | * | 3/1984 | Partanen | 106/277 |
| 4,537,635 A | | 8/1985 | Bart et al. | |
| 4,683,005 A | * | 7/1987 | Poirier | 106/284 |
| 5,262,043 A | | 11/1993 | Boenigk et al. | |
| 5,558,702 A | | 9/1996 | Chatterjee et al. | |
| 5,667,576 A | | 9/1997 | Chatterjee et al. | |
| 5,746,906 A | * | 5/1998 | McHenry et al. | 208/22 |
| 5,762,699 A | * | 6/1998 | McGovern | 106/279 |

* cited by examiner

*Primary Examiner*—David Brunsman
(74) *Attorney, Agent, or Firm*—Richard D. Stone

(57) ABSTRACT

A better asphalt based sealer for driveways and the like is disclosed. The material uses as a hybrid sealer base or binder comprising a blend of pitch, asphaltic material and cut-back oil as a partial or complete replacement for pure coal tar materials. Driveway sealer (an emulsion of clay, water and binder) made with this hybrid binder has significantly better durability and color than like materials made with a binder of asphalt and cut-back oil. The hybrid binder has less odor and fewer toxins than a binder made of pure coal tar material.

9 Claims, 2 Drawing Sheets

FINISHED EMULSIFIED BASED PAVEMENT SEALER VISCOSITY
VS. ASPHALT CONTENT OF HYDROCARBON COMPONENT

SEALER FROM ASPHALT AND PITCH

CROSS REFERENCE TO RELATED APPLICATIONS

This application claims the benefit under 35 U.S.C. 120 of prior provisional application No. 60/114,522, filed on Dec. 31, 1998.

BACKGROUND OF THE INVENTION

I. Field of the Invention

The invention relates to a sealer for asphalt pavement or metal surfaces.

II Description of the Prior Art

There are two basic types of driveway or pavement sealer—coal tar based and asphalt based. These materials are primarily used to seal driveways and other pavement surfaces, but can also be used to seal metal surfaces, e.g., pipe coatings.

Coal tar is the premier product and has the largest market share. Driveway sealer made from coal tar is an emulsion of water, coal tar pitch, clay and water, perhaps with emulsifier and optional ingredients such as sand. These materials are long lasting, have a pleasing black color and are resistant to gasoline and kerosene spills, but have an objectionable odor during application and contain aromatic compounds, some of which are polynuclear aromatics (PAHs). Economic costs for coal tar derived products are higher than petroleum. Furthermore, supply issues for coal tar pitch indicate supply problems will intensify in the upcoming future.

Asphalt based materials are made from distilled petroleum fractions, typically vacuum tower bottoms or perhaps atmospheric tower bottoms. These heavy hydrocarbon fractions are sometimes oxidized or "blown" to change the asphalt properties. Asphalt based sealers do not smell as much as the coal tar based materials and are able to withstand a wider range of temperatures. The asphalt sealers are not as toxic and some states permit only asphalt based sealers to be sold. Asphalt sealers do not have the black color desired by many users. Asphalt sealers do not last as long, and frequently must be reapplied every year or every two years.

U.S. Pat. No. 4,222,916, Hergenrother, RUBBERIZED COAL TAR PITCH EMULSION, discloses a coal tar based sealer with acrylate emulsion.

U.S. Pat. No. 4,537,635, Bart et al, discloses a coal tar driveway sealer.

U.S. Pat. No. 4,052,290, Cushman et al, teaches oxidizing or air-blowing of asphalt.

U.S. Pat. No. 4,537,635, Bart et al, teaches driveways sealers from oxidized coal tar.

U.S. Pat. No. 5,558,702, Chatterjee et al, ASPHALT EMULSIONS CONTAINING AMPHOTERIC EMULSIFIER, taught use of asphalt emulsions to "avoid the use of coal tar and its derivative".

U.S. Pat. No. 5,667,576, Chatterjee et al, ASPHALT EMULSIONS, taught forming an asphalt emulsion from AC-20 asphalt and an emulsifier and mixing with varying amounts of a lime/clay/sand/carbon black mixture.

Despite the extensive amount of driveway sealer sold, and an extensive amount of work reported in the patent literature, the work is essentially directed to either a coal tar based material or an asphalt based material. This is probably due in large part to the relative incompatibility of the two types of materials. Although both could be described as heavy, sticky materials, they are vastly different. Asphaltic fractions obtained by distilling crude oil, if heated and poured on your desk, would make a sticky mess that would be difficult to remove. If cooled to room temperature and hit with a hammer, it would dent and coat the hammer head with some asphalt. Pitch with a similar softening point, if heated and poured on a desk, then cooled, would behave differently. It would form a smooth, glassy solid. If hit with a hammer, it would shatter, and could be swept from the desk surface leaving the desk relatively clean.

Some work has been done on blending coal tar and petroleum pitch for a specialty application, anode binder pitch. This work, reviewed next, was directed to blending two pitches (one derived from coal tar, one from petroleum), and did not teach or suggest blending asphalt with a pitch fraction.

U.S. Pat. No. 5,746,906, COAL TAR PITCH BLEND HAVING LOW POLYCYCLIC AROMATIC HYDROCARBON CONTENT AND METHOD OF MAKING THEREOF, was directed to Al anode pitch, for manufacture of anodes for aluminum smelting. The patent taught in this application, that up to 10% asphalt could be blended into coal tar pitch with no ill effect. The use of 60:40 coal tar pitch:petroleum pitch blends was possible by blending a coal tar pitch with a relatively high softening point (130–175° C.) with a petroleum pitch with a much lower softening point (75–85° C.).

We wanted to make a better asphalt based driveway sealer. We wanted to minimize the amount of expensive, and potentially toxic and foul smelling, coal tar pitch material used. We wanted to maximize use of asphalt, but produce a driveway sealer with better properties than the asphalt based materials previously used.

We discovered that we could make a better asphalt based sealer by using a blend of asphalt and pitch and cut-back oil as a substitute for coal tar pitch. We retained many of the desirable properties of the coal tar based materials, but with reduced amounts of carcinogens. We believe that the cut-back oil acts as a co-solvent for the asphalt and pitch materials, rendering them compatible.

This material retains many of the desirable properties of the coal tar based sealers, but with reduced carcinogen levels due to the reduced amount of coal tar pitch used.

BRIEF SUMMARY OF THE INVENTION

Accordingly, the present invention provides a binder or sealer base comprising pitch, asphalt and cut-back oil.

In another embodiment, the present invention provides driveway sealer emulsion of water, clay and sealer base, wherein said sealer base comprises a blend of petroleum or coal tar pitch with a softening point above 40° C., asphalt having a softening point above 40° C., and cut-back oil in an amount sufficient to reduce the viscosity of said sealer base to 100 centipoise as measured by rotational Brookfield.

DETAILED DESCRIPTION

Figure 1:
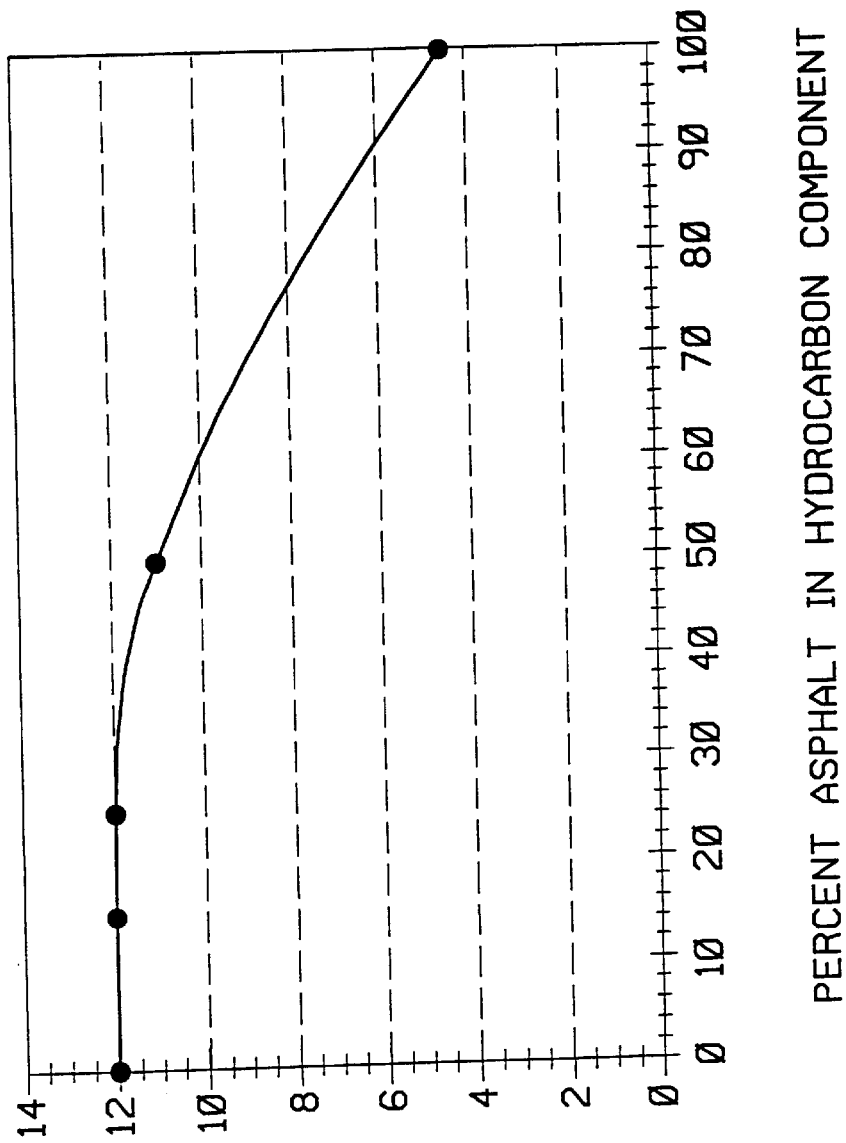
FIG. 1 is a plot of wear resistance of driveway sealer based on percent asphalt in the binder.

For clarity, and to avoid the confusing terminology used in many patents, several terms will be defined. This "definition" section is intended as an overview, with detailed specification for each material provided later.

Driveway sealer means a driveway or paving sealer comprising:
- water,
- clay,
- emulsifier and
- "sealer base" or "binder".

The sealer base or "binder" is the hydrocarbon portion of the driveway sealer. This bonds with or acts as a "binder" for the pavement or driveway. Sealer base of the prior art was coal tar pitch for coal tar based driveway sealers. Sealer base of the prior art was asphalt for driveway sealers made from asphalt.

Sealer base or "binder" of the invention comprises a blend of:
- asphalt (or bitumen),
- a pitch material and
- a cut-back oil.

Asphalt is conventionally recognized in this field as a dark brown to black cementitious material in which the predominant constituents are bitumens that occur in nature or are obtained in the fractionation of petroleum. Asphalt contains high molecular weight hydrocarbons soluble in some hydrophobic solvents. Bitumen is generally known as a class of black or dark-cementitious substances, natural or manufactured. Asphalts have been known for years in various naturally-occurring types. Conventional asphalts are obtained as heavy fractions obtained through the refining or fractionation of petroleum feed streams. If an asphaltic crude is distilled in an atmospheric tower, the atmospheric tower bottoms can be heavy enough to be classified as an asphalt fraction from which all distillable (at atmospheric pressure) hydrocarbons have been removed. Usually, the atmospheric tower bottoms are subjected to vacuum distillation to produce vacuum bottoms from which a vacuum gas oil (VGO) fraction has been removed. Tar sands from Lake Athabasca and the like may also be processed by hot water washing, centrifuging, etc., then distilled to produce a heavy residue fraction which qualifies as "asphalt" or "bitumen."

Petroleum pitch is a residue from heat treatment and distillation of petroleum fractions. It is a solid at room temperature, consists of a complex mixture of numerous predominantly aromatic and alkyl-substituted aromatic hydrocarbons, and exhibits a broad softening point range instead of a defined melting point. Coal tar pitch is a residue produced by distillation or heat treatment of coal tar. It is also solid at room temperature, consists of a complex mixture of numerous predominantly aromatic hydrocarbons and heterocyclics, and exhibits a board softening point range. Unlike petroleum pitch, coal tar pitch contains small carbon particles known as primary quinoline insolubles. Ref. Introduction to Carbon Technologies, Editors H. Marsh, E. A. Heintz, F. Rodriquez-Reinoso, Secretariado de Pulbicaciones, 1997. Wood tar pitch, never used in driveway sealers, has been made for millennia by "cooking" pine oil or the liquid recovered during charcoal manufacture. All these materials, whether derived from coal tar, petroleum or wood, are "pitch" for the purposes of the present invention.

Cut-back oil is a normally liquid hydrocarbon stream which is compatible with both the pitch and the asphalt fraction. There are many suitable hydrocarbon streams in a refinery, and may range from naphtha fractions to very heavy liquids which are only distillable under a vacuum, e.g., vacuum gas oil. Preferred streams are aromatic extract from lube plants, cycle oil and slurry oil from Fluidized Catalytic Cracking (FCC) columns, and coker gas oils. In some cases the refining process can be adjusted to leave the cut-back oil in either the asphalt or the pitch product. Examples include running the vacuum column to leave significant amounts of VGO in the asphalt or adjusting pitch fractionation to leave lighter pitch components, such as creosote, in the pitch fraction.

Emulsifier means a surfactant or detergent or dispersing agent added to help mix the oil of the sealer base with water to form an emulsion. Use of emulsifiers is well known.

Clay is an essential and well known part of the driveway sealer. The sealer may contain sand, carbon black or other colorants, plastics, thickeners, anti-stripping agents and the like.

There is nothing patentable, per se, about any individual component used herein, and excellent driveway sealers can be made with "off the shelf" ingredients which are staple articles of commerce.

More details will now be provided about each component.

Each part of the sealer base or "binder" of the invention will now be reviewed in depth, namely the asphalt (or bitumen), the pitch material and the cut-back oil. After this review of the individual components, preferred ratios or blends of various materials will be reviewed, ending with a brief discussion of some conventional additives for driveway sealer (clay, sand, colorants, and the like) and other sealer applications.

ASPHALT

The asphalt can be any heavy hydrocarbon fraction having certain minimum specifications, preferably a fraction produced by distillation. Preferred are asphalt fractions from asphaltic crudes produced by vacuum distillation. These materials may be "air blown", oxidative thermal processing, to increase viscosity or "viscosity penetration index" or some other property, using conventional technology disclosed in U.S. Pat. No. 4,052,290.

Less suitable are asphalt fractions produced by solvent deasphalting, such as propane deasphalting or the ROSE (Residual Oil Supercritical Extraction) process. These materials may be used, but do not work as well as asphalt fractions obtained by distillation.

Properties of various asphalt cement tractions are reported in Table 1.

TABLE 1

REQUIREMENTS FOR ASPHALT CEMENT
GRADED BY VISCOSITY AT 60° C. (140° F.)
(Grading based on original asphalt)

| | Viscosity Grade | | |
|---|---|---|---|
| Test | AC-5 | AC-10 | AC-20 |
| Viscosity, 60° C. (140° F.), poises | 500 + 100 | 1,000 + 200 | 2,000 + 400 |
| Viscosity, 135° C. (275° F.), cSt, Min | 110 | 150 | 210 |
| Penetration, 25° C. (77° F.), 100 g., 5 sec-min | 120 | 70 | 40 |
| Flash Point, COC, ° F. - Min. | 350 | 425 | 450 |
| Solubility in trichloroethylene, % Min | 99.0 | 99.0 | 99.0 |
| Tests on residue from Thin-Film Oven Test: | | | |
| Viscosity, 60° C. (140° F.), poises-maximum | 2,000 | 4,000 | 8,000 |

TABLE 1-continued

REQUIREMENTS FOR ASPHALT CEMENT GRADED BY VISCOSITY AT 60° C. (140° F.)
(Grading based on original asphalt)

| Test | Viscosity Grade | | |
|---|---|---|---|
| | AC-5 | AC-10 | AC-20 |
| Ductility, 25° C. (77° F.) @ 5 cm/Min, Min | 100 | 50 | 20 |

Spot test (when and as specified) (2) with:
Standard naphtha solvent Negative for all grades
Naphtha-Xylene-solvent, % Xylene Negative for all grades
Heptane-Xylene-solvent, % Xylene Negative for all grades
(1) If ductility is less than 100, material will be accepted if ductility at 15.6° C. (60° F.) is 100 minimum.
(2) The use of the spot test is optional, When it is specified, the Engineer shall indicate whether the standard naphtha solvent, the naphtha-xylene solvent, or the heptane-xylene solvent will be used in determining compliance with the requirement, and also, in the case of xylene solvents, the percentage of xylene to be used.

PITCH

The pitch component can be any pitch material meeting the specifications summarized at the end of this section. The pitch can be derived from coal, petroleum or even wood. In most commercial uses, either coal tar pitch or petroleum pitch will be used.

Coal tar pitches may be made using the method and apparatus of U.S. Pat. No. 4,066,159, METHOD AND APPARATUS FOR THE CONTROL OF PITCH STILL OPERATION. An oxidized coal tar distillation cut may also be used as disclosed in U.S. Pat. No. 4,537,635.

Petroleum pitches may be made using the method disclosed in U.S. Pat. No. 4,671,848 (Ashland), U.S. Pat. No. 4,243,513 (Witco), U.S. Pat. No. 3,140,248 (Mobil).

Eminently suitable for use herein are the petroleum pitch products available from Marathon Ashland Petroleum and sold under the designation A-240, A-225 and A-170 as well as from British Petroleum (BP) sold under designation Trolumen 250.

TABLE 2

Specifications and Typical Properties of Marathon Ashland Petroleum Pitch CAS Number 68334-31-6

| Analysis | Test Method | A170 Pitch[1] | A240 Pitch[1] | A225 Pitch[1] | Trolumen Pitch[2] |
|---|---|---|---|---|---|
| Specification Points | | Limits | | | |
| Softening Point, Mettler ° C. | ASTM D3104 | 79.4–82.6 | 118–124 | 105–110 | NA |
| Softening Point, Ring & Ball ° F. | ASTM D36 | 166–171 | 235–248 | 212–221 | 121 |
| Flash, Cleveland Open Cup, ° C. minimum | ASTM D92 | 200 | 270 | 260 | NA |
| Coking Value, Modified Conradson Carbon, wt %, minimum | ASTM D2416 | NA | 49 | 46 | 42 |
| Sulfur Content, wt %, maximum | ASTM D1552 or D4294 | NA | 3.0 | 1.5 | 2.0 |

TABLE 2-continued

Specifications and Typical Properties of Marathon Ashland Petroleum Pitch CAS Number 68334-31-6

| Analysis | Test Method | A170 Pitch[1] | A240 Pitch[1] | A225 Pitch[1] | Trolumen Pitch[2,4] |
|---|---|---|---|---|---|
| Typical Properties | | Values | | | |
| Specific Gravity, Helium Pycnometer, g/cc, minimum | ASTM D71 | 1.18 | 1.22 | 1.22 | 1.18 |
| Moisture, wt %, maximum | — | — | 0.5 | — | — |
| Toluene Insolubles, wt %, minimum | ASTM D4072 | — | 2.10 | 2.10 | — |
| Quinoline Insolubles, wt % maximum | ASTM D2318 | 0 | 0.5 | 0.5 | — |

[1]Marathon Ashland Petroleum LLC Refinery Specification Book
[2]Literature values

CUT-BACK OIL

There are a variety of refinery liquid hydrocarbon streams which can be used. These include:
   FCC light cycle oil
   FCC heavy naphtha
   FCC slurry oil, or clarified slurry oil
   Gas oil
   Vacuum Gas Oil
   Coker naphtha
   Coker gas oil
   #6 Fuel oil (a mix of low value refinery streams)
   Aromatic Extract A flash point specification or phase compatibility limit usually sets the minimum boiling point or front end volatility of such streams.

In general, heavy liquid hydrocarbon streams are better "co-solvents" or cut-back oils than light liquid hydrocarbon streams.

In general, highly aromatic streams are better solvents for the condensed, multi-ringed aromatic structures which make up both the pitch and asphaltic fractions.

Such materials are well known and widely sold, and further discussion thereof is not necessary as one could go to a refinery and purchase these streams.

Critical cut-back oil properties are somewhat dictated by the initial softening point of the pitch, but in general for the examples specified are:
   Cleveland Open Cup Flash (COC) of 270–400° F.
   Viscosity, Fural @ 122° F. of between 20–50 seconds Cut-back oils are preferentially aromatic in nature to provide the best solvency to the system. Aliphatic oils may produce a silvery sheen due to incapability with the highly aromatic pitch. However, use of pure distillate streams as cutter oils instead of slurry oil or fuel oils which are producing from cracking processes would produce additional improvement in environmental impact in addition to replacing coal tar with either petroleum pitch and/or asphalt if found to be sufficiently compatible.

COAL TAR/PETROLEUM PITCH RATIOS

The process of the present invention works especially well either pure coal tar pitch or a mixture of coal tar pitch and petroleum pitch when the odor or toxicity of the coal tar pitch can be tolerated.

Replacing coal tar pitch with petroleum pitch can decrease the amount of PAHs up to 85%. Asphalt has essentially no PAHs.

When mixtures of coal tar and petroleum pitch are used, it is beneficial when the petroleum pitch forms at least 10–95 wt %, more preferably 15–75 wt %, and most preferably 25–50 wt % of the total pitch component. A blend of 35–45 wt % petroleum pitch and 65–55 wt % coal tar pitch gives especially good results.

PITCH/ASPHALT RATIOS:

In general, the higher pitch content means better quality, color and longevity. At a minimum, the asphalt fraction should comprise at least 10 wt % of the total (asphalt+pitch content), and preferably the asphalt fraction is 15 to 90 wt % of this total, more preferably 25–80 wt %, and most preferably 50–70 wt %.

If the asphalt content of the (pitch+asphalt) is on the order of 5–10 wt %, the beneficial effect is small. The product will be of good quality, but still have most of the carcinogens and odor of the pure coal tar product. A significant reduction in odor and carcinogen concentration occurs when the asphalt displaces a substantial ($\geq 15\%$) amount of the pitch component.

Surprisingly, there is a significant benefit from adding minor amounts of pitch to the asphalt, with a marked improvement in the finished emulsified sealer wear resistance. Addition of 15% pitch in the asphalt binder essentially doubles the wear resistance of the finished sealer base as defined by the modified scrub test. Test results are reported in FIG. 1.

BINDER (SEALER BASE) PROPERTIES

This section reviews the ratios of (asphalt+pitch) to cut-back oil, both in terms of relative ratios of each and in terms of finished sealer base properties.

The finished sealer base has to meet the following specifications for use in a driveway sealer formulation.

TABLE 3

| Property | Method of Test | Specification |
| --- | --- | --- |
| Float @ 50° C., seconds | ASTM D139 | 190–300 |
| Flash Point, COC, ° C. | ASTM D92 | >165 |
| Ash, wt % | ASTM D2415 | 0.3 max |
| Distillation, wt % | ASTM D20 | |
| 0–170° C. | | 0.0 |
| 0–270° C. | | 6.0 max |
| 0–300° C. | | 15.0 max |
| Softening Point of Residue @ 300° C., R&B, ° C. | ASTM D36 | 45–55 |

Many of these properties are specified for safety (flash point) or ability to work with these materials in the field (viscosity).

Great latitude is possible on ratios of cut-back oil to (pitch+asphalt) because both the pitch and the asphalt can be manufactured to contain their own cutter stock.

A coal tar pitch still operation can be adjusted so that the cut withdrawn from the pitch still contains significant amounts of lighter material. This "sloppy" fractionation of coal tar pitch is commonly used to make the grades of coal tar pitch required for driveway sealer base.

A petroleum pitch still can be run the same way as a coal tar pitch still, i.e., leave lighter material in the heavy pitch product. A special low softening pitch, much lighter than say A-240 pitch, may be produced in this way. The A-240 pitch is present in the product, but, as produced from the pitch still, will contain enough lighter material that the softening point is much lower than that of A-240.

In practice, many refiners will prefer to operate their pitch stills at constant conditions and produce, e.g., A-240 pitch and dilute it or add "cut-back" oil to produce a pitch with a lower softening point.

It is especially beneficial if the pitch component is a fairly high softening point material and the cut-back oil has a relatively low front end volatility. This allows the front end volatility of the sealer base, and flash point, to be accurately controlled. Pitch fractionation is a bit difficult to do because the streams are so heavy. Running the pitch still to make a fairly consistent heavy product permits reliable operation without fear of dumping a lot of light ends in the heavy pitch product. Normally liquid hydrocarbon streams, such as FCC cycle oils or slurry oil, are fairly easy to fractionate and the fractionation equipment used can produce fairly accurate "cuts" of the liquid hydrocarbons so that a relatively narrow boiling range cut-back oil can be obtained.

The discussion which follows presumes that refiners (both coal tar and petroleum pitch) produce pitch products with a softening point of around 240° F. If any pitch product used herein has a significantly lower (or higher) softening point, the amount of cut-back oil added to the sealer base is reduced (or increased) by the amount of cut-back oil needed to produce a pitch with a 240° F. softening point.

Phrased another way, the amount of cut-back oil specified for the sealer base recipe includes the amount of cut-back oil present in (or required to be added to) the pitch component, if the pitch does not have a softening point of about 240° F.

Figure 2:
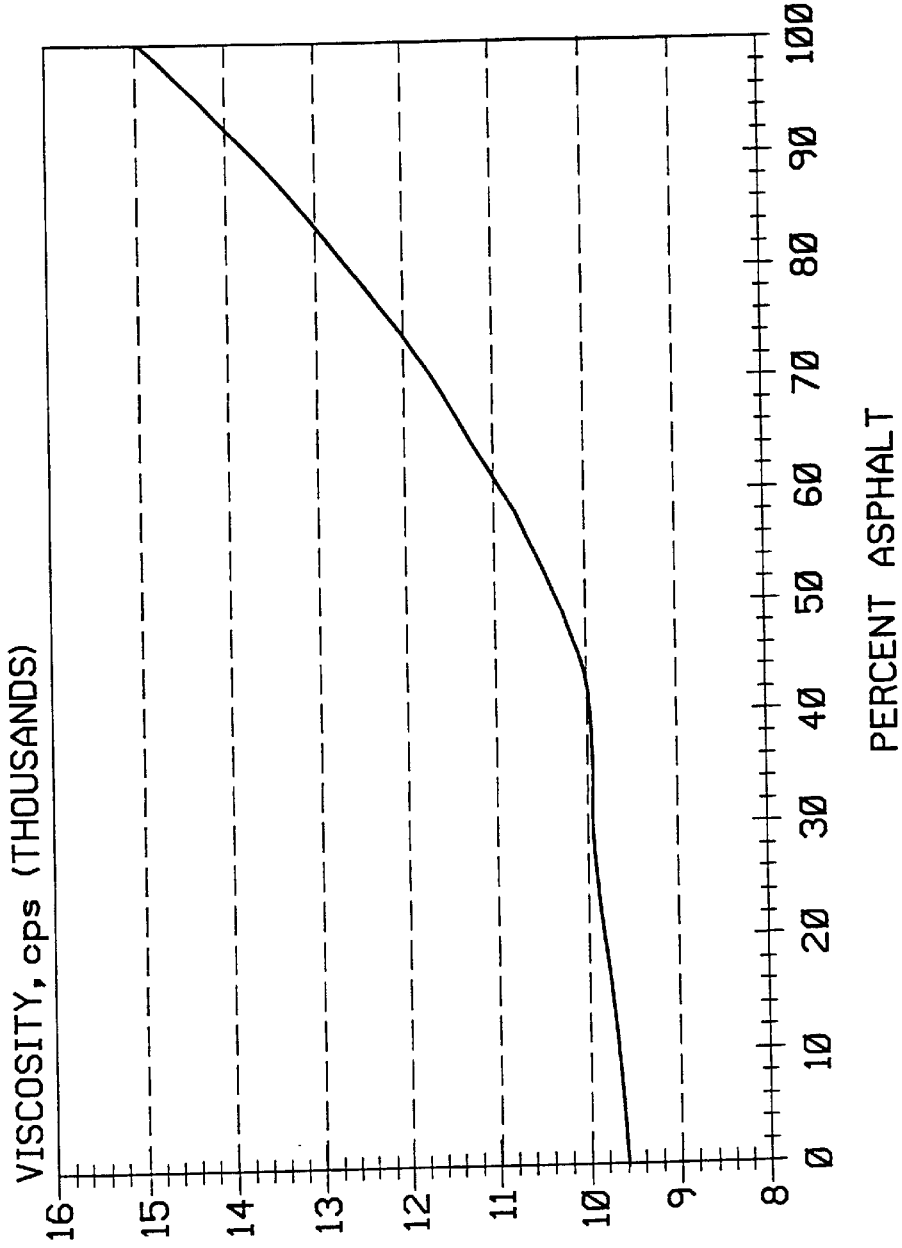
FIG. 2 is a graphical presentation of viscosity versus composition for blends of various pitch and asphalt materials.

For a fuel oil of 459 centipoise viscosity and COC flash point of 146° C., the amount of cutter oil required to meet binder specifications is impacted by the softening point of the pitch or asphalt. This relationship is demonstrated graphically for blends prepared with Ashland A-240 pitch, Trolumen 250 pitch and three different grade asphalts, see FIG. 2.

ADDITIVES

There are some additional components which are preferred for sealer base and also for generalized sealing, such as coating metal surfaces. These materials are commercially available and, per se, form no part of the present invention.

EMULSIFYING AGENTS

Suitable emulsifying agents can include aqueous polyvinylalcohol, aqueous amines, aqueous compounded amines, such as those available from Akzo Chemicals and sold under the tradename Redicote (i.e., Redicote E-9) or those available from B. F. Goodrich Chemical Co. and sold under the tradename Carbopol, and aqueous solutions of aliphatic fatty acids and caustic (usually sodium hydroxide). Exemplary amines are commercially available primary aliphatic amines, trimethylaminediamines such as N-alkyl trimethylenediamine, polyethoxylated aliphatic amines and diamines ($C_8$ to $C_{18}$) amine acetate salts derived from primary, secondary or tertiary amines with the alkyl group ranging from $C_8$ to $C_{81}$, high molecular weight aliphatic primary, secondary or tertiary amines ($C_8$ to $C_{18}$), and quaternary ammonium salts containing one or two alkyl groups ranging from $C_8$ to $C_{18}$. Compounded amines are commercially available and are generally complexed or otherwise stabilized compositions with preserved amine functionality. Ionic aliphatic fatty acids include nonionic polyethoxylated fatty acid compositions available under the tradename Ethofat and other commercially available fatty acid, tall oil and tallow or animal fat ($C_8$ to $C_{18}$) based cationic emulsifiers. Emulsifers are present in the asphalt sealing compositions in amounts ranging from 0.1–10 wt %, preferably from 2–5 wt %, say about 1–3 wt % based on 100% of the sealer composition.

The appearance-enhancing additive can be selected from the group consisting of tallow, carbon black, dyes, and pigments. Appearance-enhancing additive is present in the asphalt sealing compositions in amounts ranging from 0.1–10 wt %, preferably from 1–4 wt %, based on 100% of the sealer composition.

CLAY

Essentially all driveway sealers contain a clay component. Such materials are well known and widely used.

OTHER ADDITIVES

In addition to clay, sand or ground up particles of rubber or tires may be added to improve traction or provide a better wear surface or for esthetic reasons.

ANTI-STRIP

Organic anti-strip agents can be used to promote coating and adhesion, increase the resistance of the sealer film to stripping from the clay or sand particles by the action of water. Anti-stripping additives are selected from a group of amines and amines salt. T. J. Gavin and F. A. Hughes: U.S. Pat. No. 3,347,690, Oct. 17, 1967, assigned to Atlas Chemical Industries, Inc., describe the use and chemistry. Sufficient anti-stripping additive is generally used to give good adhesiveness to the mixture. Generally upwards of 0.1% by weight of the sealer is sufficient to fulfill this requirement. A suitable range of additive found to be both efficient and economical for the mixtures of the process is 0.5%–1.5% by weight of the sealer.

SEALERS FOR METAL SURFACES/WATERPROOFING

In addition to use as a driveway sealer, the sealer base may be used as is or modified to permit use for pipe coating or the like. The material may also be used as a waterproofing agent for wood, metal and cementitious materials. For some applications the binder may be used in neat form without emulsification and applied by painting or spraying onto the surface. Viscosity may be adjusted by cutter oil choice or concentration to meet requirements for a specific application.

EXAMPLE 1

A binder is prepared by first blending Ashland AC-10 (40–45° C. softening point) with fuel oil of 459 centipoise viscosity at a 19:1 ratio or an AC-30 (50–55° C. softening point) at a 6:1 ratio. Ashland AC-10 and AC-30 are classified as neat asphalts from vacuum tower distillation. Asphalt binder is then blended with coal tar pitch at a 1:1 ratio. Properties of the final binder product are given in Table 4.

TABLE 4

Properties of Hybrid Binder

| Properties | AC-10 Binder | AC-30 Binder |
| --- | --- | --- |
| Mettler Softening Point, ° C. | 44.2 | 45.1 |
| COC Flash, ° C. | 171 | 185 |
| Float @ 50° C., Seconds | 224 | 291 |
| ASTM D-20 Distillation, wt % | — | — |
| 0–170° C. | 0 | 0 |
| 0–270° C. | 0.2 | 0.3 |
| 0–300° C. | 0.9 | 1.3 |
| Residue @ 300° C., S.P., ° C. | 36 | 38 |

EXAMPLE 2

A binder is prepared by first blending Ashland A-240 petroleum pitch (120° C. softening point with a solvent extracted SDA bottoms (93° C. softening point) at a 1:1 ratio followed by addition of fuel oil of 459 centipoise viscosity to produce a final product with a Mettler softening point of 39.8° C. comprised of 45 wt % fuel oil and 55 wt % 1:1 SDA bottoms/A-240 pitch. Properties of the final product are given in Table 5.

EXAMPLE 3

A sealer binder is prepared by first blending Ashland A-240 petroleum pitch (120° C. softening point) with a ROSE bottoms (softening point 100° C.) at a 1:1 ratio followed by addition of fuel oil of 459 centipoise viscosity to produce a final product with a Mettler softening point of 38.4° C. which is comprised of 42.9 wt % fuel oil and 57.1 wt % of the 1:1 ROSE bottoms/A-250 pitch. Properties of the final product are given in Table 5.

TABLE 5

Properties of Hybrid Binder

| Properties | Example 2 | Example 3 |
| --- | --- | --- |
| Mettler Softening Point, ° C. | 39.2 | 38.4 |
| COC Flash, ° C. | 218 | 199 |
| Float @ 50° C., Seconds | 272 | 263 |
| ASTM D-20 Distillation | — | — |
| 0–170° C. | 0 | 0 |
| 0–270° C. | 0.7 | 0.7 |
| 0–300° C. | 2.2 | 2.1 |
| Residue @ 300° C., S.P., R&B, ° C. | 47 | 46 |

The hybrid sealer product of the present invention (made from a mix of pitch and asphalt) has more oil and wear resistance, and enhanced color, compared to asphaltic sealers. The product of the present invention has less odor and is more environmentally acceptable than the coal tar based sealer materials.

The hybrid binder or "sealer base" made from (pitch+asphalt+cut-back oil if needed) is compatible with and may be a partial or complete replacement for the coal tar based products currently used to make finished driveway sealer. Thus no change is needed in manufacturing or storage procedures.

The use of asphalt, and cut-back oil if needed, permits the valuable and dwindling supply of coal tar to be extended or diverted to other uses. The replacement of much of the coal tar with the less toxic asphalt fraction and cut-back oil reduces the odor and carcinogen/toxic concentration of the driveway sealer.

The finished driveway sealer product of the present invention will usually not be as good as a pure coal tar based driveway sealer, which remains the premium product. The driveway sealer of the present invention will be better than the conventional asphalt driveway sealer materials and will be significantly less toxic than the coal tar materials.

MODIFICATIONS

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference, including any patents or other literature references cited within such documents.

We claim:

1. A binder or sealer base comprising:
   a coal tar pitch obtained as the residue product of distillation or heat treatment of coal tar, or coal or petroleum pitch obtained as a residue product from heat treatment and distillation of petroleum fractions, which is a solid at room temperature, consists of a complex mixture of numerous predominantly aromatic and alkyl-substituted aromatic hydrocarbons, and exhibits a broad softening point range instead of a defined melting point, both of which coal tar and petroleum pitch materials are solid at room temperature, asphalt obtained by atmospheric or vacuum distillation of a hydrocarbon fraction containing asphaltic components and, cut-back oil comprising a refinery liquid hydrocarbon stream selected from the group of FCC, light cycle oil, FCC heavy naphtha, FCC slurry oil, or clarified slurry, gas oil, vacuum gas oil, coker naphtha, coker gas oil, fuel oil and aromatic extract.

2. The binder of claim 1 wherein said pitch is coal tar pitch.

3. The binder of claim 1 wherein said pitch is petroleum pitch.

4. The binder of claim 1 wherein said pitch is a blend of petroleum and coal tar pitch.

5. The binder of claim 1 wherein said pitch has a softening point above 40° C.

6. The binder of claim 1 wherein said asphalt has a softening point above 40° C.

7. The binder of claim 1 wherein at least 15 wt % pitch is present in the sealer base and in an amount sufficient to increase by at least 50% the durability of the sealer in a scrub test as compared to a pitch free material.

8. A sealer and/or waterproofing material comprising the composition of claim 1.

9. Driveway sealer emulsion of water, clay and sealer base wherein said sealer base comprises a blend of:

petroleum or coal tar pitch with a softening point above 40° C., asphalt having a softening point above 40° C., and cut-back oil in an mount sufficient to reduce the Brookfield viscosity of said sealer base to 100 centipoise.

* * * * *